(12) United States Patent
Kammler et al.

(10) Patent No.: US 6,453,649 B1
(45) Date of Patent: Sep. 24, 2002

(54) DEVICE AND METHOD FOR FEEDING AN ARTICLE OR SEVERAL ARTICLES INTO A PACKAGE

(75) Inventors: Roman Kammler, Worms; Franz Kandl, Langgoens/Oberkleen; Erhard Lutz, Muecke; Walter Baur, Gruendau, all of (DE)

(73) Assignee: Rovema Verpackungsmaschinen GmbH, Fernwald (DE)

( * ) Notice: Subject to any disclaimer, the term of this patent is extended or adjusted under 35 U.S.C. 154(b) by 0 days.

(21) Appl. No.: 09/441,900

(22) Filed: Nov. 17, 1999

(30) Foreign Application Priority Data

Nov. 19, 1998 (DE) .......................................... 198 53 166

(51) Int. Cl.⁷ ............................................... B65B 5/04
(52) U.S. Cl. .............................. 53/473; 53/252; 53/566; 198/638; 198/750.1
(58) Field of Search .......................... 53/251, 252, 473, 53/475, 566; 198/638

(56) References Cited

U.S. PATENT DOCUMENTS

| | | | | | |
|---|---|---|---|---|---|
| 720,128 | A | * | 2/1903 | Green | 198/638 |
| 2,546,951 | A | * | 3/1951 | Petrilli | 198/638 |
| 3,139,999 | A | * | 7/1964 | Groenwald | 198/638 |
| 3,890,886 | A | * | 6/1975 | Fessler | 53/389.1 |
| 3,893,358 | A | * | 7/1975 | Dixon | 198/638 |
| 4,015,722 | A | * | 4/1977 | Cooper | 198/638 |
| 4,023,329 | A | * | 5/1977 | Kupcikevicius | 53/261 |
| 4,524,564 | A | * | 6/1985 | Groom | 53/251 |
| 5,588,285 | A | * | 12/1996 | Odentahl | 53/251 |

* cited by examiner

*Primary Examiner*—John Sipos
(74) *Attorney, Agent, or Firm*—Flynn, Thiel, Boutell & Tanis, P.C.

(57) ABSTRACT

A carrier (4) with articles (2) provided thereon is moved quickly toward a package (3) and is slowed down at the package (3) such that by utilizing the articles (2) kinetic energy, they slide off the carrier (4) and move into the package (3). The carrier (4) can thus be returned to an article receiving position during the feed-in process for the articles (2) in order to receive new articles (2), which can be, for example filled tubular bags.

12 Claims, 2 Drawing Sheets

DEVICE AND METHOD FOR FEEDING AN ARTICLE OR SEVERAL ARTICLES INTO A PACKAGE

FIELD OF THE INVENTION

The invention relates to a device and method for feeding an article or several articles in a packaging, for example of tubular bags, into a package, e.g. a folding box.

BACKGROUND OF THE INVENTION

It is known to move a tubular bag by means of a slide member into a lying, open folding box. This is done either when the folding box stands still or when the folding box is continuously moved, while the concurrently moved slide member moves the tubular bag into the folding box. It is furthermore known to move a stack of superposed tubular bags into a folding box.

The known device and the known method have the disadvantage that the feed-in process takes a long time since the slide member must cover a relatively long feeding path between the position of receiving a tubular bag and the removal position moving the tubular bag into the box. Even in the case where the slide member is driven relatively quickly, this feed-in path limits the packaging speed.

The basic purpose of the invention is to increase the feed-in performance and thus the packaging speed.

SUMMARY OF THE INVENTION

The purpose of the invention is attained by providing a movable carrier for receiving at least one article, which carrier can be moved quickly toward the receiving package by means of a drive, and which carrier can be stopped abruptly or slowly at the package so that, due to a utilization of the kinetic energy of the at least one article, it slides off the carrier and moves into the package during a slowing down or a stopping of said carrier. The article is in the method of the invention accelerated in horizontal direction and is then thrown, utilizing its kinetic (or inertial) energy, at a drop (insertion) point into a laterally open package (e.g. box).

The invention has the advantage that the feed-in performance and thus the packaging speed is increased. Directly after the dropping off the article, the carrier can again be returned in order to receive a new article so that the return occurs at least partially during the drop and thus still during the feed-in process (i.e. the article is still being fed into the package). This results in a time advantage so that the time until the next feed-in process is reduced (i.e. adjacent feed cycles overlap). A further time advantage results from the carrier covering a shorter path than a conventional slide member for the feed-in process and also for the return since the remaining path to the package from the carrier-stop position is traveled during the dropping action by the article without the carrier. This shortened path results also in an increased packaging speed.

Additional advantageous developments of the invention are described as follows.

When the carrier has a hold-back element on its side not facing the package for holding the article during an acceleration phase, it is then possible to hold the articles on the carrier in a safe manner so that they do not slide from the carrier during the acceleration.

An electromagnetic linear drive is particularly suitable as the drive for the carrier. With such a drive it is possible to achieve extreme (large) acceleration values up to approximately twenty times the acceleration due to gravity. The drive can also slow down at a significant rate and can be adjusted very precisely. With this drive it is possible to realize in a simple manner high article dropping speeds at precise time intervals at an exact drop point, which can still further increase the packaging performance.

An accelerated carrier can also be stopped abruptly by means of a stop element so that the articles are thrown therefrom and fly into the package from the carrier. When in addition a spring is provided on the stop element, then not only the movement of the carrier is cushioned in order to protect the structural parts but the kinetic energy of the carrier is also utilized in order to compress the spring, and thereafter the carrier is pushed back by the relaxing action of the spring.

When the carrying surface of the carrier is a sliding surface, then an easy sliding off of an article or several articles from the sliding surface is possible, which results in an exact dropping time.

When the package is transported passed the drop point, it can then be filled with the suggested dropping technique during a transport to a further packaging station along the transporting direction. The feed-in (insertion) process can thereby be carried out more safely, when the package for the purpose of the feed-in process is moved passed the drop point with a reduced speed and is again accelerated after the feed-in process has occurred. Because of the decreasing speed, the direct feeding of an article occurs at a relatively low speed of the package. The speed of passing packages can be relatively high between two feed-in processes in order to altogether achieve a high transporting performance for the packages.

A safe and reliable feed-in is achieved when the dropping speed of an article is at least eleven times greater than the transporting speed of the package at the time of the drop or the arrival at the package at the drop position. It is thereby also possible that the transporting speed is zero and the dropping speed has a relatively random value. A transporting speed unequal to zero at the time of the drop or the arrival of the article in the package and permanently for a device for transporting of the package has, however, the advantage that the device must not be repeatedly accelerated from standstill, which would mean a loss of time.

It is possible to respectively insert the articles into relatively close packages and to thereby avoid unnecessary free space in the direction of the transporting speed of the packages, when at the time of the drop a predicted interval in the transporting direction of the packages are provided so that the drop occurs while the packages are still spaced by the distance of the predicted interval from the point of entry of the article or of the articles into the packages. In addition, when this needed space is less, the greater the relationship between dropping speed and transporting speed is.

The articles can, when utilizing their kinetic energy after their drop and prior to reaching the respective packages, slide over a slide path in order to further reduce the path of movement of the carrier. The slide path can thereby have a drop (incline) in order to prevent a significant reduction of the kinetic energy of an article.

BRIEF DESCRIPTION OF DRAWINGS

The invention will be described further hereinafter in connection with two exemplary embodiments illustrated in the drawings, in which.

DETAILED DESCRIPTION

Figure 1:
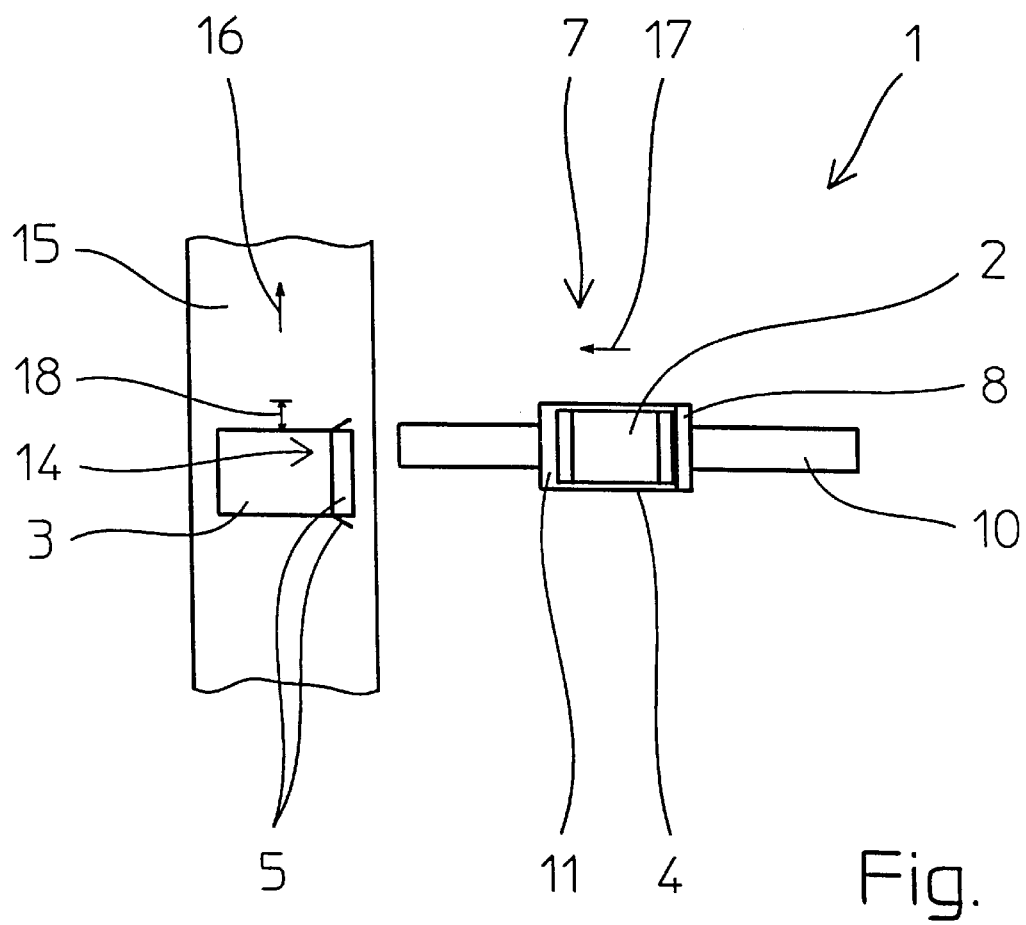
FIG. 1 is a top view of a device for feeding filled tubular bags into a folding box moving there passed on a conveyor belt, whereby the tubular bags lie on a carrier, which can be moved toward the open folding box by means of an electromagnetic linear drive and can be stopped in such a manner that the tubular bags slide off of the carrier and move into the folding box.
Figure 2:
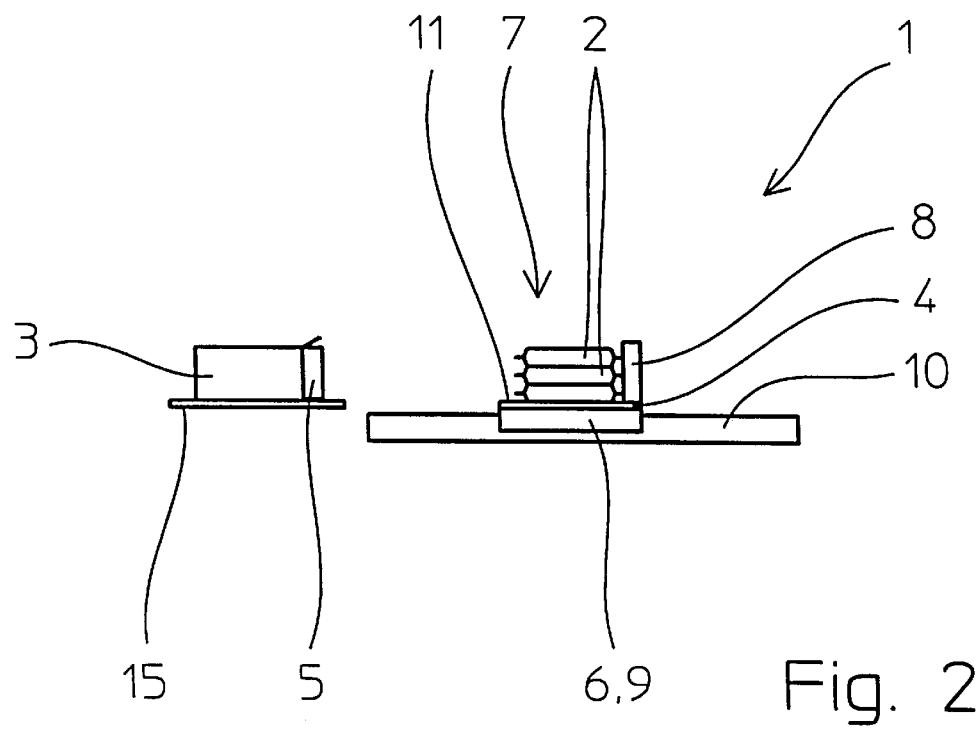
FIG. 2 is a side view of the subject matter of FIG. 1.

A device 1 for feeding (insertion) of three articles 2 into a laterally open, lying packages (box) 3 has a carrier 4 for receiving at least one, here shown as three articles 2 (FIG. 1, FIG. 2). Filled tubular bags are illustrated as the articles 2, which tubular bags are moved into folding boxes at its open end, which can be closed by flaps 5. The carrier 4 can be moved by means of a drive 6 rapidly horizontally toward the package 3 and can be slowed down abruptly in front of the package 3 so that by utilizing the kinetic (and inertial) energy of the articles 2 during stopping of the carrier 4, the articles 2 slide off of the carrier 4 at a drop point 7 and move into the package 3 through its open end.

The carrier 4 has on its end not facing the package 3 a back stop, hold-back element 8, for holding the articles 2 in a controlled orientation during an acceleration phase. The hold-back element 8 is a wall extending upwardly from the top of the carrier 4. The drive 6 is an electromagnetic linear drive. This linear drive consists of a movable part 9, which is rigidly connected to the carrier 4, and a static part 10, along which the movable part 9 together with the carrier 4 can be moved upon application of an electromagnetic motive force to the carrier. The carrying (upper) surface 11 of the carrier 4 is a sliding (reduced friction) surface.

Figure 3:
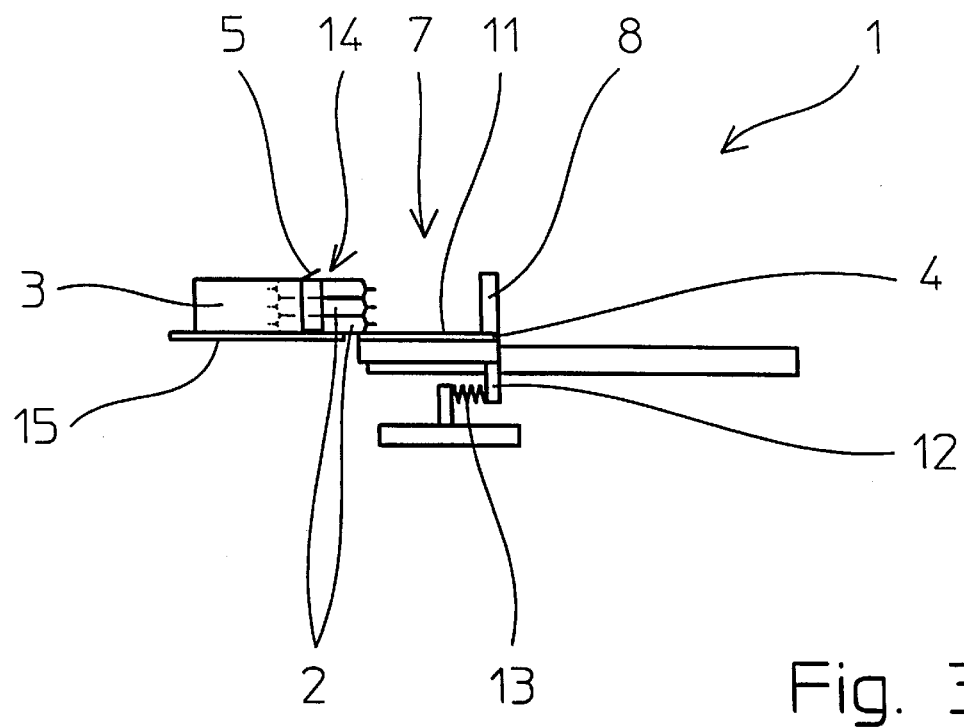
FIG. 3 is a side view of the subject matter analogous to FIG. 2, however, in a different operating position during feed-in of the articles into the folding boxes and with a cushioned stop element for stopping the carrier.

The carrier 4 is in the exemplary embodiment of FIG. 3 abruptly stopped by means of a stop element 12 and spring 13 so that the articles 2 slide precisely at the point 14 of the package 3 during passing of the drop point 7 into the package 3. The arriving carrier 4 abuts with its stop element 12 against the spring 13, compresses same, and thereby the articles 2 overcome the friction force holding the articles on the carrier and freely slide therefrom, and is, after the spring 13 relaxes again, moved to the right into a position at which it again receives three tubular bags (articles).

The packages 3 are moved passed the drop point 7 on a conveyor belt 15. The packages 3 are spaced at equal distances from one another on the conveyor belt 15. The conveyor belt 15 is operated alternately quicker and slower in transporting direction 16 so that the packages 3, for the purpose of receiving the articles 2, are slowly transported passed the drop point 7, and are directly prior to and thereafter quickly moved. The articles 2 arriving in feed-in direction 17 are released at the drop point 7 by turning off the drive 6 or contacting the stop 12 in order to move the article into package 3 arriving at the drop point 7. The dropping speed is at least eleven, or preferably twelve times greater than the transporting speed at the time of the drop, which causes the articles 2 to be reliably moved into the package 3, which is designed relatively narrow in transporting direction 16.

A predicted interval 18 is provided in transporting direction 16 for the package 3 so that the drop (release of the article from the carrier) occurs already when the package 3 is still positioned away from the point 14 of entry of the articles 2 into the package 3 the distance of the predicted interval 18. During the flight of the articles 2 from the drop point 7 to the package 3, the package 3 has covered a distance in transporting direction 16, which distance equals the predicted interval 18. The package 3 passes the drop point 7 with a transporting speed, which is unequal to zero.

Although particular preferred embodiments of the invention have disclosed in detail for illustrative purposes, it has been recognized that variations or modifications of the disclosed apparatus, including the rearrangement of parts, lie within the scope of the present invention.

We claim:

1. A device for feeding at least one article having a shape that correlates to the shape of an interior of a package supported on a moving surface, comprising: a carrier configured to receive and support the article in a controlled orientation thereon, a drive connected to the carrier and configured to quickly accelerate carrier with the article oriented thereon toward a drop point in a horizontal direction, wherein a path of movement of said carrier is substantially perpendicular to a path of movement of the package as the package approaches the drop point, said drive being configured to abruptly stop or abruptly decelerate said carrier in a direction toward the drop point such that the kinetic energy of the article will aid the article in sliding off the carrier in the controlled orientation and moving into the interior of the package, and said carrier and said moving surface being additionally configured to maintain the controlled orientation of said article constant with respect to an angular orientation of the interior of said package as said article moves past said drop point and into the interior of said package.

2. The device according to claim 1, wherein the carrier has an end facing the package and an end facing away from the drop point and a back stop positioned on the end facing away from the drop point for holding the article on the carrier and providing the configuration controlling the orientation of the article on the carrier.

3. The device according to claim 1 wherein said drive is an electromagnetic linear drive.

4. The device according to claim 1, including a stop element configured to contact and stop the carrier.

5. The device according to claim 4, wherein said stop element is a spring.

6. The device according to claim 1, wherein a carrying surface of the carrier is a sliding surface.

7. A method for feeding at least one article into a package, comprising the steps of accelerating a carrier with the article thereon in a horizontal direction, abruptly stopping or abruptly decelerating the carrier to effect a throwing of the article into a laterally open package at a drop point, at least in part by utilizing kinetic energy of the article created during the accelerating step while maintaining the orientation of the article, and setting a dropping speed of the article to be at least eleven times greater than a transporting speed of the package when the article arrives at the package.

8. The method according to claim 7, further comprising the step of moving the package passed the drop point.

9. Tile method according to claim 8, further comprising the steps of moving the package at a reduced speed past the drop point to facilitate the throwing step and accelerating the package once the article is received in the package.

10. The method according to claim 9, further comprising the step of initiating the throwing step when the package is still a predicted interval from a point of entry of the article into the package.

11. The method according to claim 11, further comprising the step of setting a transporting speed of the package to be unequal to zero when the article is received in the package.

12. The method according to claim 7, further comprising the step of sliding the article over a reduced friction surface of the carrier after being dropped off a carrier and prior to reaching the package.

* * * * *

UNITED STATES PATENT AND TRADEMARK OFFICE
CERTIFICATE OF CORRECTION

PATENT NO. : 6,453,649 B1
DATED : September 24, 2002
INVENTOR(S) : Roman Kammler et al.

It is certified that error appears in the above-identified patent and that said Letters Patent is hereby corrected as shown below:

<u>Column 4,</u>
Line 12, after "accelerate" insert -- said --.
Line 52, replace "Tile" with -- The --.
Line 59, replace "11" with -- 10 --.

Signed and Sealed this

Twenty-eighth Day of September, 2004

JON W. DUDAS
*Director of the United States Patent and Trademark Office*